United States Patent [19]

Li

[11] Patent Number: 5,538,813
[45] Date of Patent: Jul. 23, 1996

[54] ELECTROCHEMICAL STORAGE DEVICE HAVING ASYMMETRIC ELECTRODES

[75] Inventor: Changming Li, Vernon Hills, Ill.

[73] Assignee: Motorola, Inc., Schaumburg, Ill.

[21] Appl. No.: 552,403

[22] Filed: Nov. 3, 1995

[51] Int. Cl.⁶ ....................................... H01M 6/18
[52] U.S. Cl. .................... 429/192; 429/203; 429/207; 429/213; 429/218; 429/219; 429/221; 429/222; 429/223; 429/224; 429/225; 429/229; 361/502; 361/523; 361/525; 361/528
[58] Field of Search ........................ 429/191, 192, 429/203, 204, 207, 213, 218, 219, 221, 222, 223, 224, 225, 229; 361/433, 502, 523, 524, 525, 528

[56] References Cited

U.S. PATENT DOCUMENTS

| 4,500,667 | 2/1985 | Polak et al. . | |
|---|---|---|---|
| 4,705,545 | 11/1987 | Polak et al. . | |
| 4,824,528 | 4/1989 | Polak et al. | 204/1 T |
| 5,429,893 | 7/1995 | Thomas | 429/218 |
| 5,442,478 | 8/1995 | Lampert et al. | 359/273 |

FOREIGN PATENT DOCUMENTS 0078404  9/1982  European Pat. Off. .

OTHER PUBLICATIONS

Electroanalytical Chemistry and Interfacial Electrochemistry Elsevier, et al., J. Electroanal. Chem., App. 1–5 1971 (month not available).

Ruthenium Dioxide: A New Electrode Material . . . , Galizzioli, et al., Laboratory of Electrochemistry, Journal of Applied Electrochemistry 13 Nov. 1973.

Ruthenium Dioxide: A New Electrode Material . . . Part 1., Galizzioli, et al, Journal of Applied Electrochemistry 12 Jun. 1973.

Oxide Films at Ruthenium Electrodes, Hadzi–Jordanov, et al., J. Electrochem. Soc. Sep. 1978.

The A–C Response of Iridium Oxide Films, Glarum, et al., Bell Laboratories, J. Electrochem. Soc. Jul. 1980.

Primary Examiner—M. Nuzzolillo
Attorney, Agent, or Firm—Kenneth M. Massaroni

[57] ABSTRACT

An electrochemical storage device is fabricated from two opposing asymmetric electrode assemblies (10) and (11) and a solid polymer electrolyte (15). A first electrode is fabricated from a conducting polymer such as polyaniline, polypyrrole, or polythiothene. The second electrode is fabricated from a metal, metal hydroxides, metal oxides and combinations thereof. The solid polymer electrolyte is in intimate contact with and situated between the first and second electrodes. The solid polymer electrolyte may be made from a polymeric binder or support structure such as polyethylene oxide, polyvinyl alcohol, or other polymeric materials. Dispersed in the polymeric support structure may be either an acidic or basic material, such as KOH or $H_3PO_4$.

10 Claims, 7 Drawing Sheets 5,538,813

1

ELECTROCHEMICAL STORAGE DEVICE HAVING ASYMMETRIC ELECTRODES

TECHNICAL FIELD

This invention relates in general to electrochemical cells, and more particularly to electrochemical charge storage cells having asymmetric electrodes.

BACKGROUND OF THE INVENTION

Energy generation and storage has long been a subject of study and development. Of special importance is the storage of electrical energy in a compact form that can be readily charged and discharged such as rechargeable batteries and/or electrochemical capacitors. High power, high current pulse rechargeable electrochemical charge storage devices, are very important in applications using electrical pulses, such as digital communications, power tools, and portable computers, to name but a few applications. In these devices, high electrochemical kinetic rate, long cycle life of the electrode, and good ionic conductivity of the electrolyte are all extremely important considerations.

Most high powered electrochemical charge storage devices, such as electrochemical capacitors, use aqueous electrolytes since aqueous electrolytes are known to have the highest ionic conductivities. However, aqueous electrolytes result in problems when handling and packaging the devices. This is due to the fact that aqueous electrolytes are generally liquid and hence have a propensity to leak out of the packages into which they are sealed. Furthermore, many high power electrochemical energy storage devices demonstrate poor cycle life due to dendrite growth on the electrodes thereof. Dendrite growth results in the formation of pinholes between the electrodes, thus resulting in short circuits which significantly reduce the cycle life of the battery, and which represent a severe limitation in the state of the conventional art.

Electrochemical capacitors can generally be divided into two subcategories: Double layer capacitors in which the interfacial capacitance at the electrode/electrolyte interface can be modeled as two parallel sheets of charge; and pseudocapacitor devices in which charge transfer between the electrode and the electrolyte occurs over a wide potential range. These charge transfers are the result of primarily, secondary, and tertiary oxidations/reduction reactions between the electrode and the electrolyte. These types of electrolyte capacitors are now being developed for high-pulse power applications, such as those described hereinabove.

Pseudocapacitor devices are disclosed in, for example, European Patent Application No. 82109061.0 to Dwight Craig. The devices disclosed and claimed in the Craig reference generally relate to pseudocapacitor devices having aqueous electrolytes therein. As such, the devices may be subject to the limitations of aqueous based systems such as those described hereinabove.

Furthermore, these devices suffer from high material cost and low cell voltage. There are two kinds of pseudocapacitor materials: metal oxides, i.e., ($RuO_2$, $IrO_2$, $CoO_2$, etc.) and redox conductive polymers (i.e., polyaniline, polypyrrole, and polythiophene, etc.) Metal oxide capacitors are very expensive as many of the preferred metals, such as Ru and Ir, are very costly. Redox polymers have relatively high energy storage capacity, low cost and long cycle life. However, these conductive polymers have a narrow working voltage in proton conducting electrolytes. For example, a single cell device made from symmetric (i.e., two) polyaniline electrodes can only have 0.5 V device voltage. This drawback decreases the polymer device energy density significantly.

Accordingly, there exists a need to provide novel electrochemical capacitor devices free of the limitations inherent to prior art systems. Such devices should have high ionic conductivities, provide high power and high energy, and be fabricated of relatively environmentally benign materials. Moreover, fabrications of such devices should be simple, inexpensive, and readily repeatable.

DETAILED DESCRIPTION OF THE PREFERRED EMBODIMENT

Figure 1:
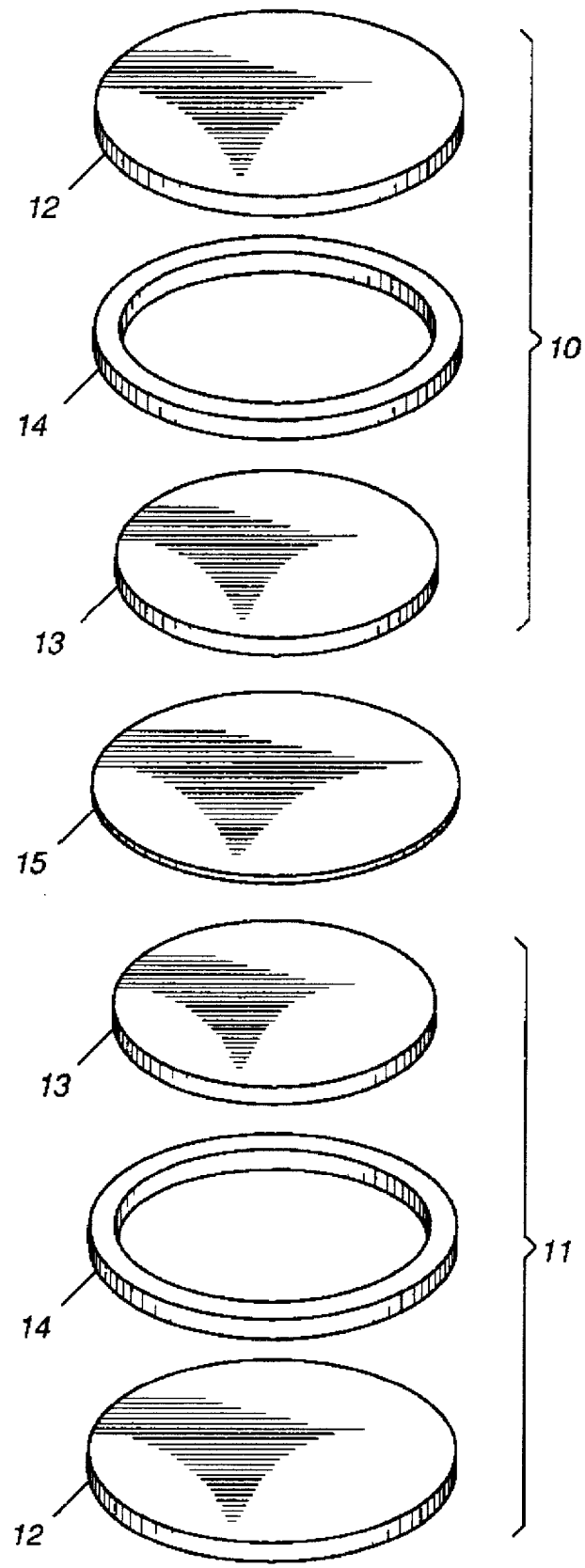
FIG. 1 is a exploded view of an electrochemical charge storage device in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein an electrochemical charge storage device such as an electrochemical battery, or an electrochemical capacitor. In a preferred embodiment, the electrochemical charge storage device is an electrochemical capacitor. The electrochemical capacitor comprises a pair of asymmetric electrode assemblies 10 and 11. As used herein, the term "asymmetric electrodes" means that the electrodes 13 are not made from the same composition, i.e., they are made from different materials. Moreover, as used herein, "assymetric" refers to the fact that one electrode is fabricated of an organic material, while the second is fabricated of inorganic material. In a preferred embodiment of the invention, one of the asymmetric electrodes is fabricated from a metal or metals, such as aluminum, bismuth, iron, indium, magnesium, manganese, lead, tin, antimony, tungsten, zinc, gold, silver, copper, chromium, cobalt, molybdenum, nickel, ruthenium, iridium, cadmium, vanadium, oxides thereof, hydroxides thereof, alloys thereof, and combinations thereof.

The second asymmetric electrode is preferably fabricated of a polymer, such as a conductive polymer. Examples of conductive polymers from which the second electrode may be fabricated include, but are not limited to polyaniline, polypyrrole, polythiophene, poly[3-(p-chlorophenyl)-thiophene], poly[3-(p-fluorophenol)-thiophene], n or p-doped conducting polymers, and combinations thereof. Each electrode assembly, 10 and 11, may include a current collector 12 which is electrically conducting. The current collector 12 is preferably electrochemically inert to the electrolyte 15, which is described in greater detail hereinbelow. A housing or gasket 14 may be employed to house the electrodes and the electrolyte, but is optional, particularly if a solid electrolyte is used. The electrolyte 15 is sandwiched between the electrodes and is in the form of a film, such as a polymer film, which also may serve as a separator between the two electrode assemblies 10 and 11. Thus, free and unobstructed movement of ions is provided. The combination electrolyte separator prevents contact between the opposing electrodes since such a condition results in a short-circuit and malfunction of the cell.

In a preferred embodiment of the instant invention, the electrolyte is a polymer electrolyte which is in contact with the electrode assemblies 10 and 11. The polymer electrolyte comprises a polymeric support structure selected from the group of polyethylene oxide, polyvinyl alcohol, polyvinyl, acetate, polyacrylamide, poly(vinyl pyrollidene), poly(2-vinyl pyridene), poly(4-vinyl pyridene), and polyethylene imine. Dispensed in the polymeric support structure is an electrolyte active species, such as described hereinbelow. In a preferred embodiment, the polymer electrolyte support structure is fabricated from a polyvinyl resin and a proton conducting electrolyte. Polyvinyl resins are those polymeric materials generally considered to include polymers derived from monomers having the structure:

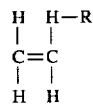

in which R represents hydrogen, an alkyl group, a halogen or other groups. Monomers may be prepared by addition of the appropriate compound onto acetylene. Properties vary with chemical structure, crystallinity, and molecular weight. For example, in a preferred embodiment, polyvinyl alcohol (PVA) is the polymeric support structure. PVA is a polymer having good mechanical integrity, and which can be formed into strong films, tubes, and fibers that are highly resistant to hydrocarbon solvents.

The polyvinyl alcohol polymer provides a polymeric support structure into which is incorporated an electrolyte active species. The electrolyte active species may be either an acidic or a basic material. Examples of preferred basic electrolyte active species include KOH, NaOH, LiOH and combinations thereof. Preferred acidic electrolyte species include phosphoric acid ($H_3PO_4$), sulfuric acid ($H_2SO_4$), hydrochloric acid (HCl), and combinations thereof. In a preferred embodiment of the instant invention, the electrolyte comprises a PVA polymeric support structure having $H_3PO_4$ incorporated thereinto. The $PVA/H_3PO_4$ electrolyte is prepared by making an aqueous solution of PVA at a concentration range of between 1 and 20% PVA by weight. The optimum range has been found to be between 5 and 10% by weight. The PVA was added to water heated to a temperature between 50° and 100° C. and is stirred until all the PVA is dissolved. PVA is commercially available in a wide range of molecular weights and it has been found that PVA obtained from Aldrich Chemical Company in the range of 80,000–140,000 molecular weight is a preferred material.

It is to be understood that other molecular weights, such as in the range of 30,000–50,000 or 50,000–80,000 are also useful and other materials with even higher molecular weights may also be advantageously employed. Those of ordinary skill in the art of polymer science will readily understand that higher molecular weight polymers tend to be more structurally sound, whereas lower molecular weight polymers tend to be less rigid and more flexible.

In general, the amount of $H_3PO_4$ to be added to the polymer binder will vary, depending upon the desired end properties and the electrolytes. For example, when the molecular ratio of acid to a repeating unit of the polymer (moles of $H_3PO_4$ to $[PVA]_n$ is less than 0.25, the conductivity of the resulting electrolyte is between about $1 \times 10^{-8}$ and $1 \times 10^{-5}$ Siemens per centimeter (S/cm). When the ratio is between 0.25 and 0.7 the conductivity of the resulting electrolyte increases to about $1 \times 10^{-5}$ to $1 \times 10^3$ S/cm. At ratios above 0.7 the conductivity of the electrolyte is greater than $1 \times 10^{-2}$ S/cm and approaching that of a pure acid. Molar ratios of acid to a repeating unit of the polymer in the range of 0.1 to 2 has been found to be useful with a value near 0.5 being preferred. Expressed another way, the acid content of the solid polymer electrolyte may be between 1% and 70% by weight.

The instant invention may be better understood from a perusal of the examples which follow hereinbelow.

EXAMPLE 1

An electrochemical charge storage device having asymmetric electrodes in accordance with the instant invention was fabricated by providing a first electrode fabricated of polyaniline, a second electrode fabricated of ruthenium dioxide ($RuO_2$) and a $PVA/H_3PO_4$ electrolyte. The $RuO_2$ electrode was fabricated using commercially $RuO_2$ materials impregnated onto a nickel foil current collector. The polyaniline electrode film was grown on a carbon coated current collecting surface via potential cycling in a 0.088 molar (M) aniline and 1M $H_2SO_4$. The range of cycling voltage was from 0.35 to 1.05 volts. The aniline and sulfuric acid used were reagent grade and purchased from Aldrich Chemical Company, Inc.

Figure 2:
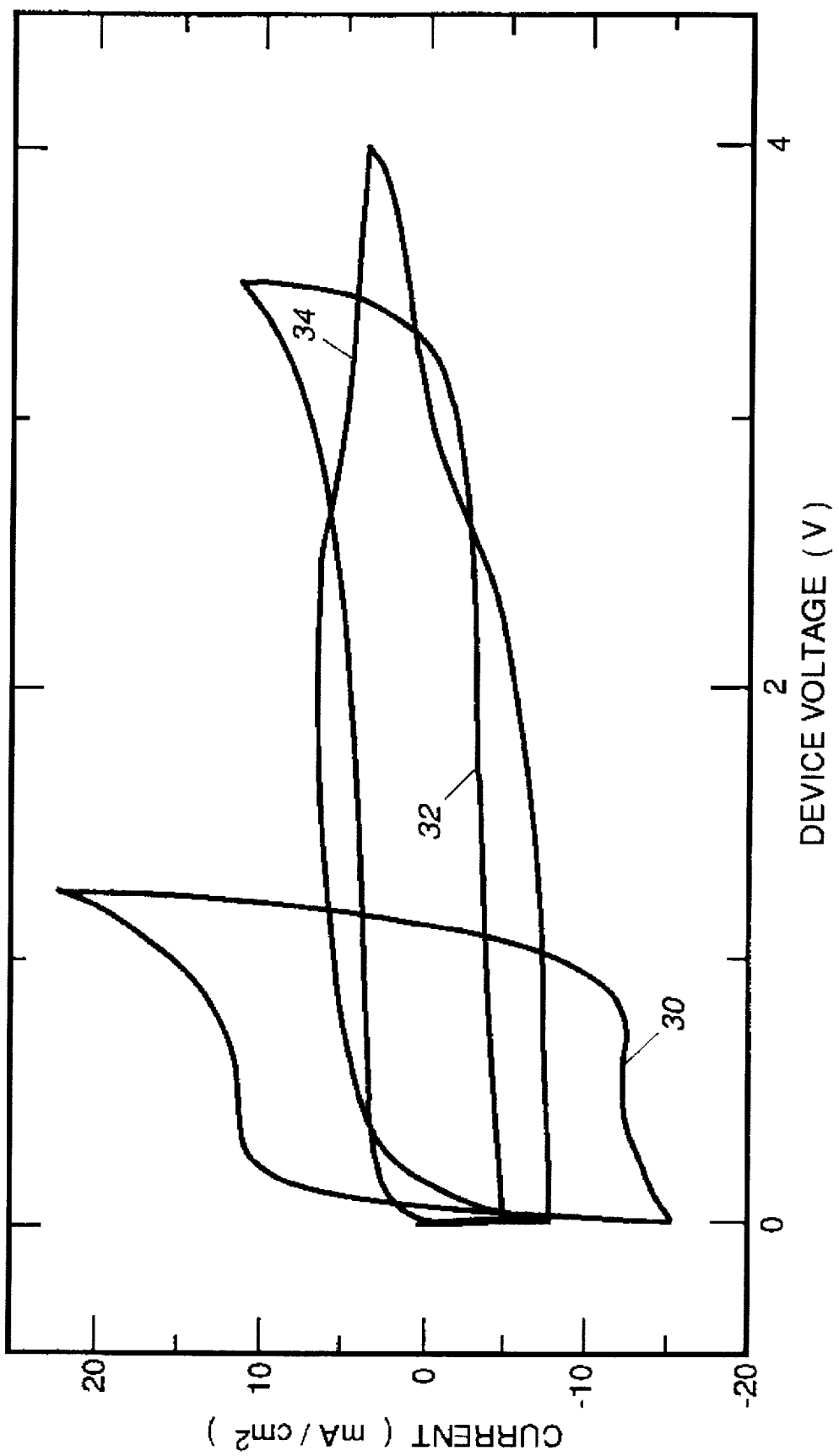
FIG. 2 is a series of cyclic voltommagrams illustrating the performance of a single cell, a three cell, and a seven cell electrochemical charge storage device in accordance with the instant invention.

Referring now to FIG. 2, there is illustrated therein the cyclic voltammagram for a hybrid, polyaniline/$PVA-H_3PO_4$/ $RuO_2$ electrochemical charge storage device such as that described hereinabove. The electrochemical performance of a single cell device is illustrated by curve 30, the electrochemical performance of three cells, as illustrated in FIG. 1, and arranged in stacked configuration is illustrated by line 32. Also, illustrated in FIG. 2 is the performance curve 34 of a seven-cell symmetric polyaniline/$PVA-H_3PO_4$/polyaniline device for purposes of comparison. Lines 30 and 32 demonstrate that a single cell and three-cell device can provide 1.2 and 3.6 volts of a working voltage window respectively. Since a single cell symmetric polyaniline capacitor provides only approximately 0.5 volts per device, the $RuO_2$ electrode in a polyaniline 1 $PVA-H_3PO_4$ system boosts polymer capacitor device voltage. It may also be appreciated that the seven-cell symmetric energy storage device illustrated by line 34 provides only 3.0 volts, less than that of the three-cell hybrid device illustrated by line 32. Accordingly, the device fabricated according to the instant invention can provide the same cell voltage in a smaller profile.

Figure 3:
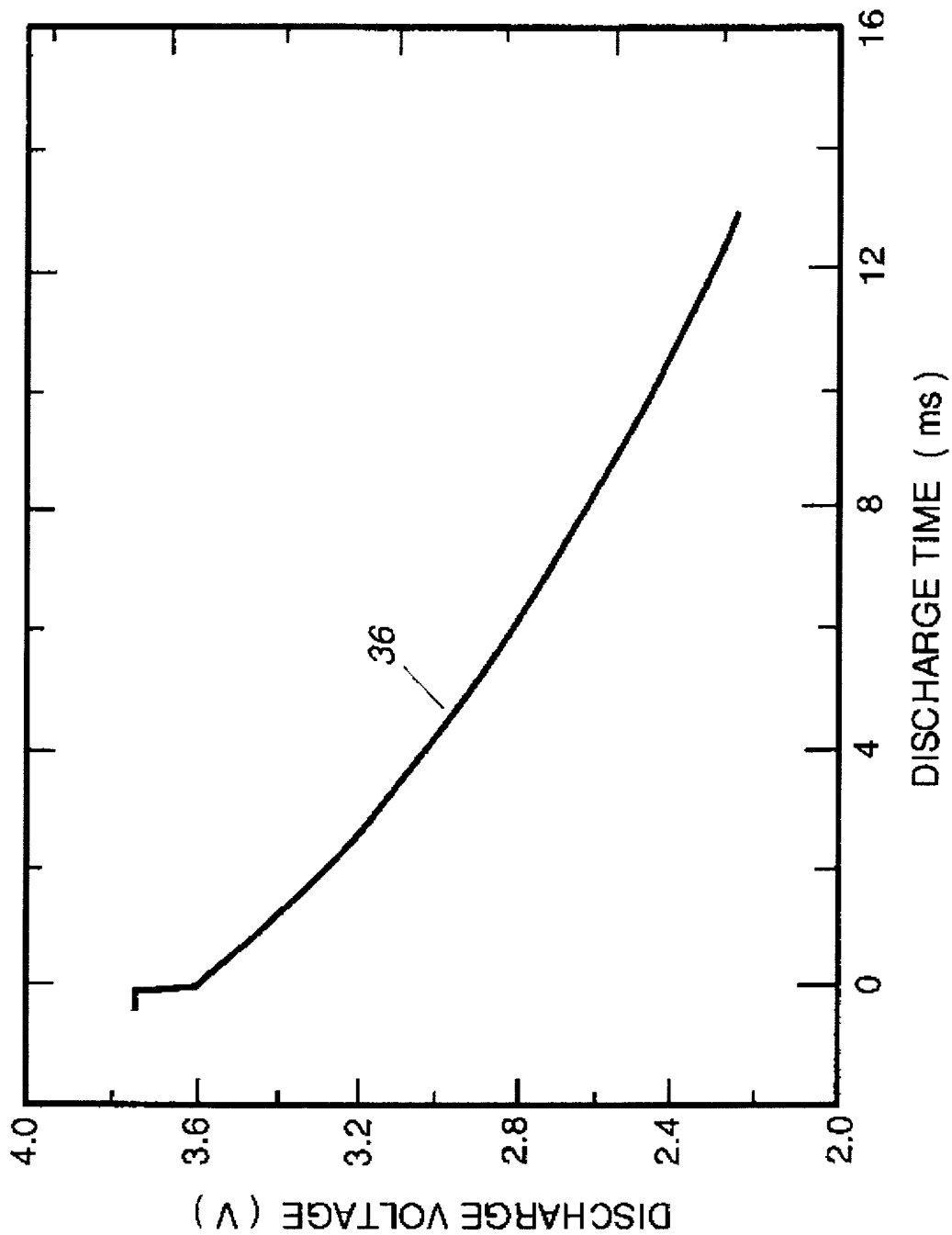
FIG. 3 is a constant current discharge curve for a three cell electrochemical charge storage device such as that described with respect to FIG. 2.

Referring now to FIG. 3, there is illustrated therein the constant current discharge curve for a three-cell hybrid polyaniline/$PVA-H_3PO_4/RuO_2$ device. The discharge curve illustrated is similar to that of an ideal capacitor discharge curve and is illustrated by line 36. The device is a 100 milliamperes/centimeter$^2$ (mA/cm$^2$)device and compares favorably to other solid state energy storage systems which only demonstrate approximately 50–400 microamps per cm$^2$. Thus, the asymmetric electrochemical energy storage device of the instant invention provides much higher power than the prior art devices. Furthermore, in comparison to a symmetric polymer capacitor device, the energy density of the hybrid device is much higher since the cell voltage is boosted by, for example, Ru. In comparison to a symmetric RuO$_2$ capacitor, the cost of the hybrid device of this Example I is lower since one electrode is made from low cost polyaniline.

EXAMPLE II

A second test device was fabricated and comprised a hybrid asymmetric electrochemical charge storage device having a first polyaniline electrode, a second zinc electrode, and a PVA/H$_3$PO$_4$ electrolyte. Both the polyaniline electrode and the PVA-H$_3$PO$_4$ electrolyte are as described hereinabove with respect to Example I. The zinc electrode was fabricated by compressing commercially available zinc onto a nickel current collector.

Figure 4:
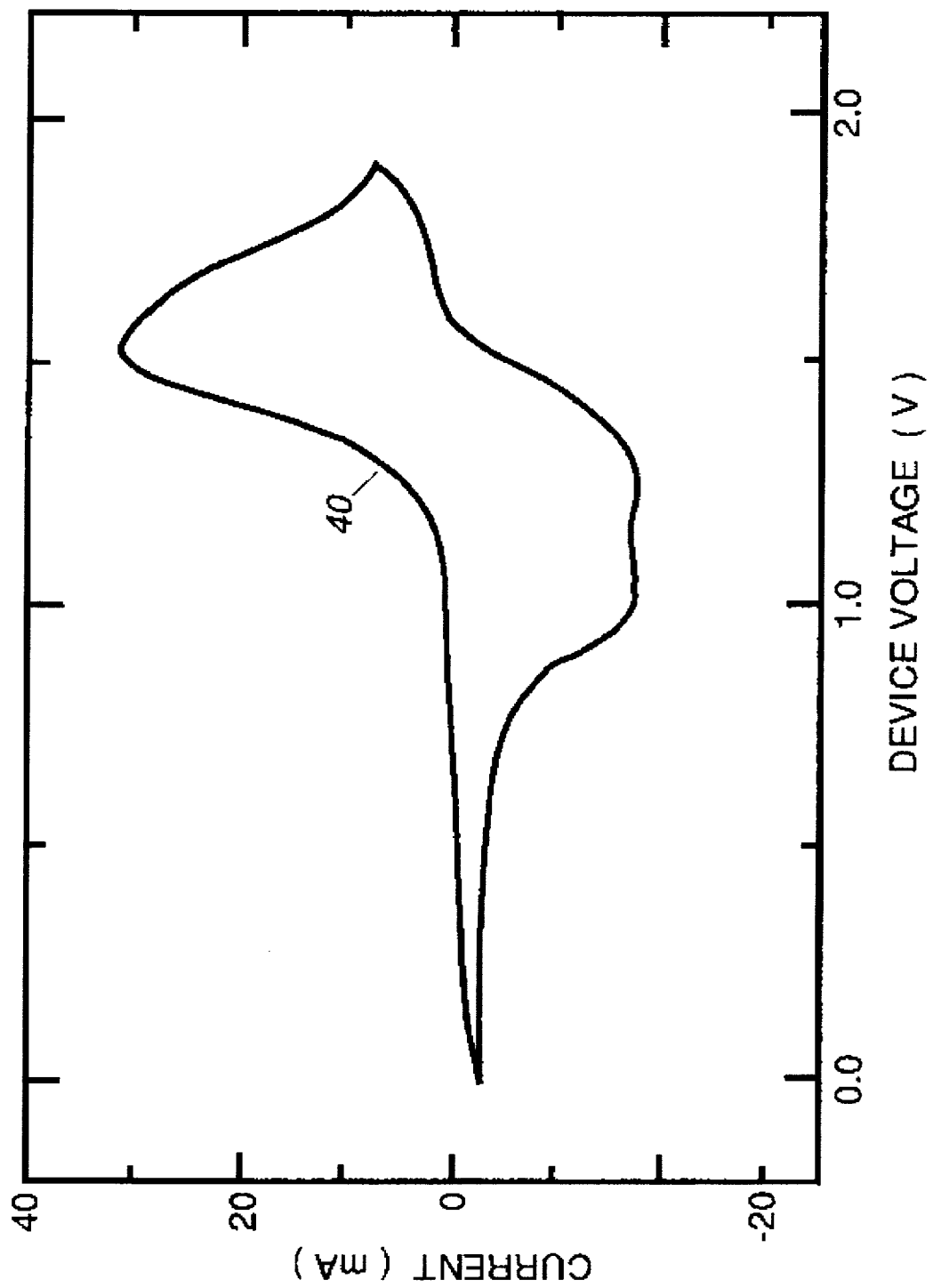
FIG. 4 is a cyclic voltommagram for an alternative embodiment of an charge electrochemical storage device in accordance with the instant invention.

Referring now to FIG. 4, there is illustrated therein a cyclic voltammagram (line 40) for a single cell polyaniline/PVA-H$_3$PO$_4$/zinc electrochemical energy storage device. As maybe appreciated from FIG. 4, the device voltage is approximately 1.8 volts which is considerably higher than a single cell polyaniline capacitor device, which provides only about 0.5 volts per device.

Figure 5:
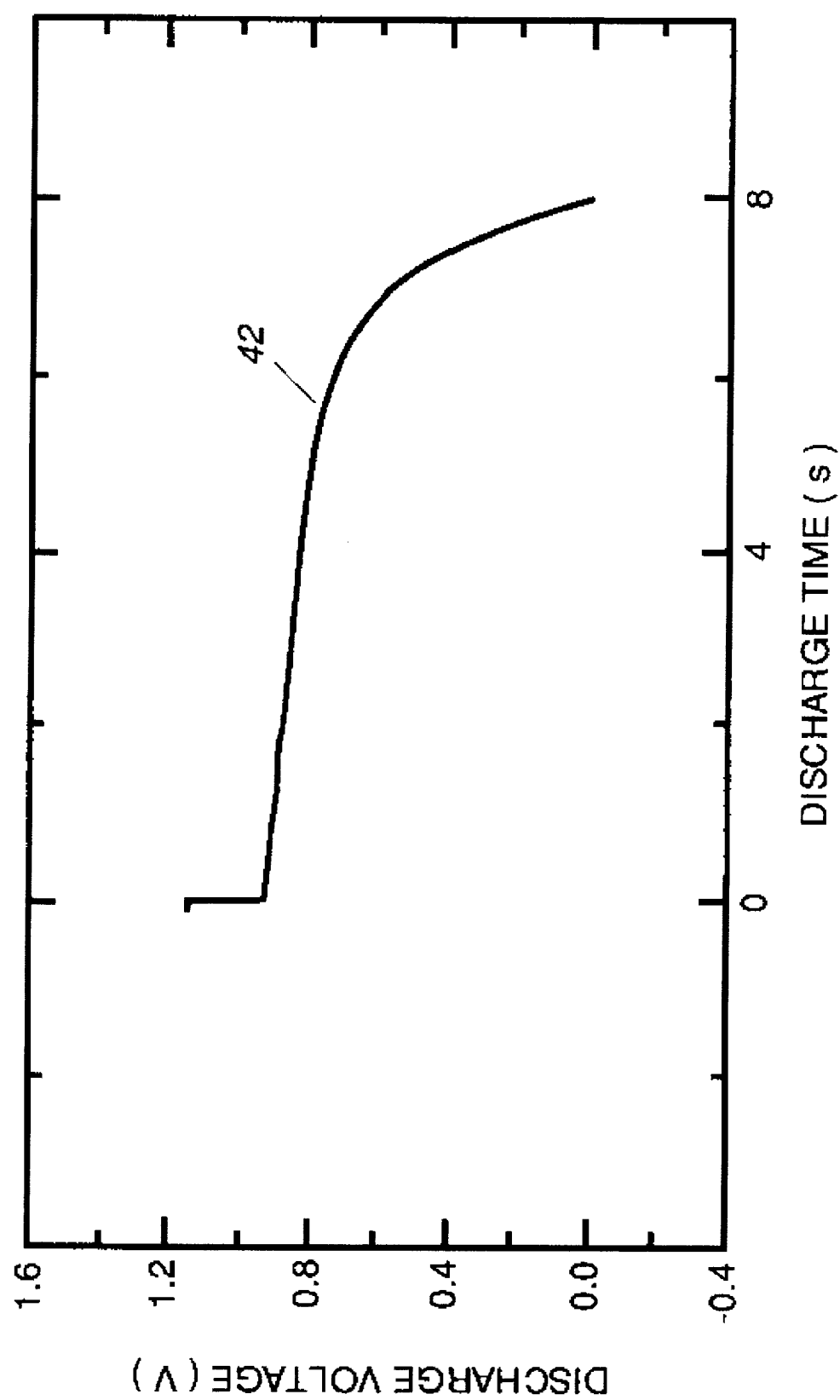
FIG. 5 is a constant current discharge curve for the electrochemical charge storage device described in FIG. 4.

Referring now to FIG. 5, there is illustrated therein a constant current discharge curve for the device described in this Example II. The device is a 50 milliamp per cm$^2$ device and demonstrates a discharge curve 42 substantially similar to that of a battery thus suggesting that the electrochemical cell is limited by the Zn electrode. At 50 mA/cm$^2$, the end discharge voltage was above 1 volt for 40 milliseconds. This result demonstrates that battery electrode material maybe used as the opposite electrode for boosting the polymer electrochemical charge storage device voltage into a usable range. However, if one makes a capacity linked electrode of polyaniline, a capacitor material, the constant current discharge curve should have a capacitor profile. Therefore, a great advantage of a hybrid device is that it can be tailored to have a battery-like or a capacitor-like discharge profile, depending upon the application. Moreover, due to the battery discharge profile, more energy stored in the electrochemical capacitor device is available for use by a specific application than would be available in an ideal capacitor.

EXAMPLE III

A third device was fabricated as an asymmetric hybrid polyaniline/PVA-H$_3$PO$_4$/Bi-Sn device. The polyaniline electrode and the PVA/H$_3$PO$_4$ electrolyte were fabricated as described hereinabove with respect to Example I. The bismuth/tin electrode was fabricated from commercially available materials pressed onto a nickel current collector. The ratio of bismuth to tin was 0.48:0.52.

Figure 6:
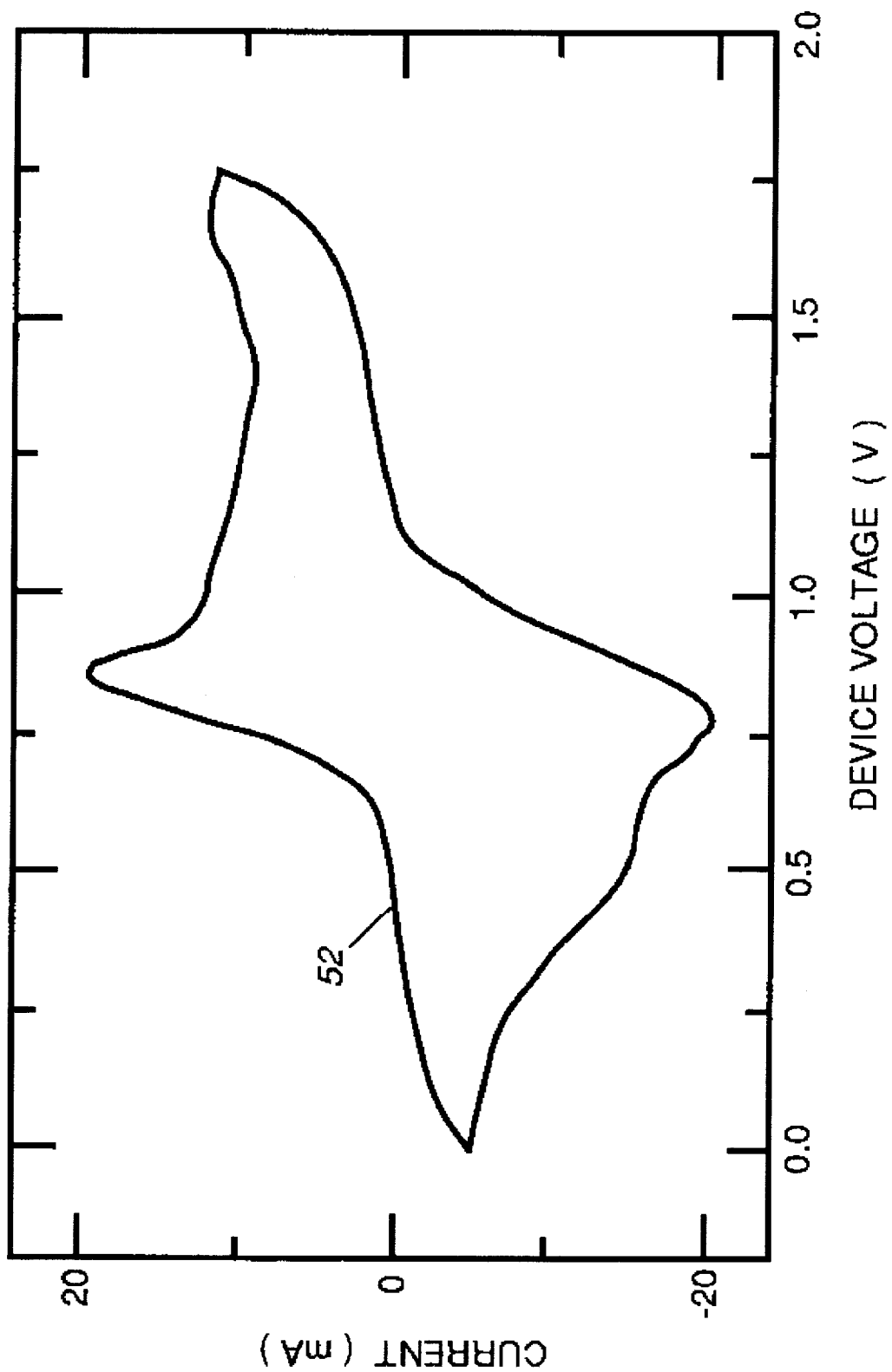
FIG. 6 is a cyclic voltammagram for a second alternative embodiment of an electrochemical charge storage device in accordance with the instant invention.

Referring now to FIG. 6, there is illustrated therein a cyclic voltammagram for the hybrid asymmetric polyaniline/PVA-H$_3$PO$_4$/Bi-Sn device in which line 52 illustrates device voltage of approximately 1.6 volts. It may thus be appreciated that the device voltage is considerably greater than that for a symmetric polyaniline capacitor device which has device voltage of only approximately 0.5 volts.

Figure 7:
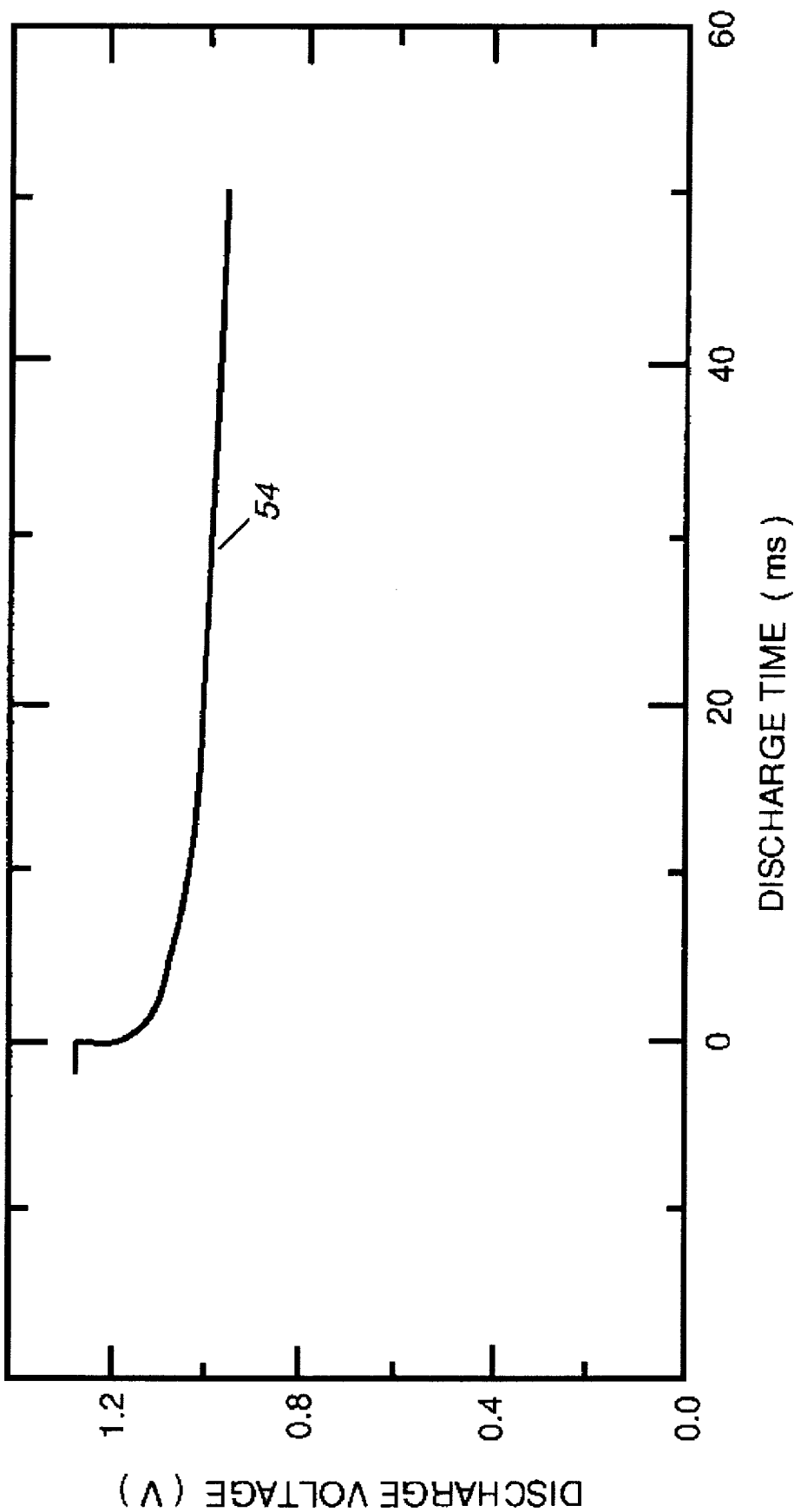
FIG. 7 is a constant current discharge curve for an electrochemical charge storage device as in FIG. 6.

Referring now to FIG. 7, there is illustrated therein a constant current discharge curve, line 54, for a single cell asymmetric electrochemical energy storage device of 50 mA/cm$^2$. The results demonstrate that the discharge curve is identical to that of a battery if a better material is used to make a polymer hybrid device. At 50 mA/cm$^2$, the end discharge voltage was above 1 volt for 40 milliseconds. This result demonstrates that a battery material may be used for the opposite electrode for boosting the polymer device voltage, providing more useful voltage to the application to which the device is attached.

The foregoing examples demonstrate that an electrochemical energy storage device, such as an electrochemical capacitor device may be fabricated wherein opposing electrodes are made from a metal oxide or battery material and a polymer so as to boost the polymer capacitor voltage for both the solid and aqueous devices. Moreover, this hybrid asymmetric system may be used to increase device voltage and thus increase energy density dramatically. Moreover, using a polymer such as polyaniline as one of the device electrodes substantially saves material costs as RuO$_2$ is known to be a relatively costly material.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical storage device comprising:

an organic first electrode consisting of a conducting polymer selected from the group consisting of polyaniline, polypyrrole, polythiophene, poly[3-(p-chlorophenyl)-thiophene], poly[3-(p-fluorophenol)-thiophene], n or p-doped conducting polymers, and combinations thereof;

an inorganic second electrode fabricated of a material selected from the group consisting of Al, Fe, In, Mn, Mg, Sb, Mo, Cr, Ni, W, V, Au, Ru, Ir, Co, Zn, Sn, Bi, Cd, Pb, Ag, alloys thereof, oxides thereof and combinations thereof; and a polymer electrolyte in contact with, and disposed between said first and second electrodes, said polymer electrolyte comprising polyvinyl alcohol having dispersed therein a proton conducting electrolyte active species selected from the group of H$_3$PO$_4$, H$_2$SO$_4$, HCl, and combinations thereof.

2. An electrochemical storage device as in claim 1, wherein said capacitor is characterized by an oxidation/reduction charge storage mechanism.

3. An electrochemical storage device as in claim 1, wherein said first electrode is fabricated of polyaniline.

4. An electrochemical storage device as in claim 1, wherein said second electrode is fabricated of an oxide of ruthenium.

5. An electrochemical storage device as in claim 1, wherein said electrolyte is polyvinyl alcohol having H$_3$PO$_4$ dispersed therein.

6. An electrochemical storage device comprising an organic first electrode, an inorganic second electrode, and a polymer electrolyte, disposed therebetween, said electrolyte comprising a polymeric support structure of polyvinylalcohol and a proton conducting electrolyte active species.

7. An electrochemical storage device as in claim 6, wherein said organic electrode is fabricated of a material selected from the group consisting of polyaniline, polypyrrole, polythiophene, poly[3-(p-chlorophenyl)-thiophene], poly[3-(p-fluorophenol)-thiophene], n or p-doped conducting polymers, and combinations thereof.

8. An electrochemical storage device as in claim 6, wherein said first electrode is fabricated of polyaniline.

9. An electrochemical storage device as in claim 6, wherein said inorganic electrode is fabricated of a material selected from the group consisting of Al, Fe, In, Mn, Mg, Sb, Mo, Cr, N, W, V, Au, Ru, Ir, Co, Zn, Sn, Bi, Cd, Pb, Ag, alloys thereof, oxides thereof and combinations thereof.

10. An electrochemical storage device as in claim 6, wherein said second electrode is fabricated of an oxide of ruthenium.

* * * * *